Dec. 27, 1949  M. V. GROVES  2,492,280
MULTIPLE VALVE
Filed Jan. 25, 1946
Fig.2
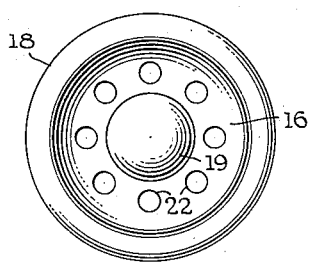
Fig.3
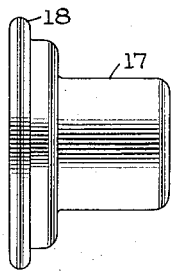
Fig.4
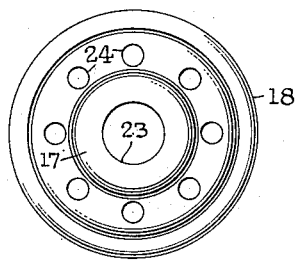
Fig.1
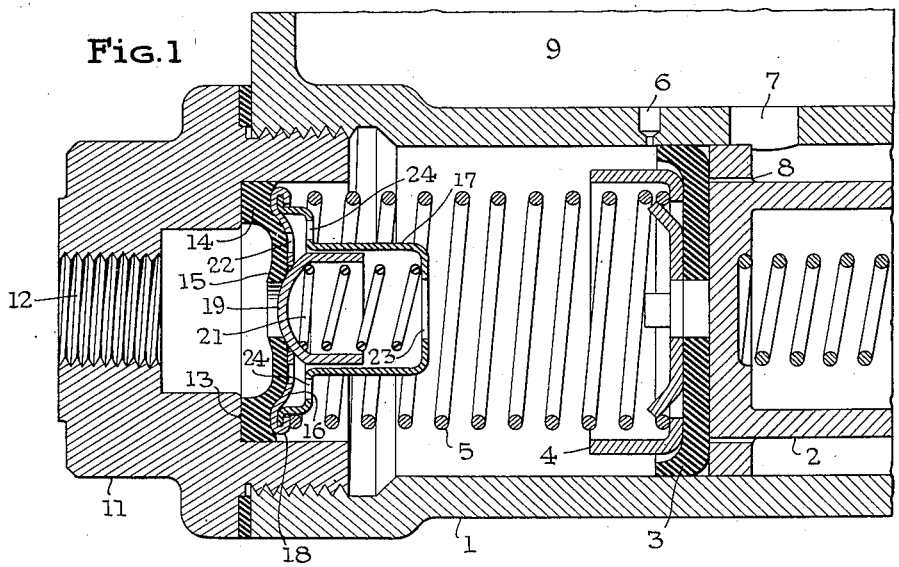
Fig.5
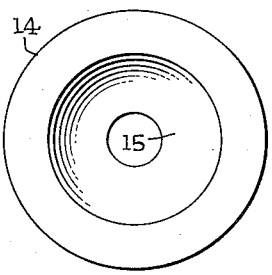
Fig.6
Inventor
Martin V. Groves
By
Attorneys Patented Dec. 27, 1949

2,492,280

UNITED STATES PATENT OFFICE 2,492,280

MULTIPLE VALVE

Martin Valentine Groves, Watertown, N. Y., assignor to The New York Air Brake Company, a corporation of New Jersey Application January 25, 1946, Serial No. 643,332

2 Claims. (Cl. 277—45)

This invention relates to multiple valves, and particularly to non-stop valves used to impose two different resistances to flows of liquid in opposite directions.

Such valves are used for a variety of purposes, for example as pressure-relief and vacuum breaking valves on storage tanks for volatile liquids, as vent valves in certain types of heating system, and so forth. An important field of use is in hydraulic braking systems for motor vehicles, where they are inserted between the master cylinder and the pressure line leading to the brake cylinders. So used they function to afford a nearly free flow to the brake cylinders and a precisely determined retarded reflux from the brake cylinders, so as to maintain the brake lines under a slight pressure at all times. The valve thus assures that the pressure lines will always be liquid filled and that the master cylinder will have a positive tendency to recharge itself with liquid from the reservoir as it reaches its fully retracted position.

While available for other uses, the valve of the present invention was developed for use in hydraulic brakes, and will be described as so embodied.

Its advantages are free and precise action, tightness of seal, and the fact that the valve functions entirely independently of the return spring for the master piston. In consequence of this last feature the return spring may be designed solely with reference to its piston-actuating function, while another spring which loads the return flow valve may be chosen for this one function.

A preferred embodiment of the invention is illustrated in the accompanying drawing in which:

Fig. 1 is an axial section through a portion of a master cylinder with the improved valve in place.

Fig. 2 is an elevation of the seat end of the housing.

Fig. 3 is a side elevation of the housing.

Fig. 4 is an elevation of the guide end of the housing.

Fig. 5 is a face view of the combined gasket and valve ring.

Fig. 6 is an axial section of the combined gasket and valve ring.

The master cylinder is shown at 1, the master piston at 2, the piston packing cup at 3, the cup retainer at 4 and the master piston return spring at 5. Recharging passages for the cylinder working space appear at 6, 7 and 8. These supply liquid to the working space in the master cylinder from reservoir 9. The cylinder head 11 has a connection 12 for the pressure line that leads to the brake cylinders (not shown).

No novelty is here claimed for the parts so far described for they conform to commercial practice.

At a point between cylinder 1 and connection 12 is a shoulder 13 upon which is seated a combined gasket and check valve formed of a rubber-like material not adversely affected by the brake liquid. This member has a heavy rim 14 which is the gasket portion and an internal flange-like valve portion 15 which functions as a check valve. The combined gasket and check valve is annular in form, and the valve portion 15 when unstressed is of the form shown in Fig. 6. In Fig. 1 the parts are shown as they would appear when connection 12 is under the slight hydrostatic pressure which persists when the brakes have been released.

Seated against the cylinder side of member 14—15 is a housing made up of two stampings 16 and 17 flanged together at 18. The part 16 is a valve seat and the part 17 serves as a guide for the cup-shaped metal check valve 19 and as a seat for its loading spring 21.

The part 16 is concavo convex as shown, its concave side being presented to the member 14—15. At its center it has an aperture whose margin serves as a seat for valve 19. In circular series around this central aperture are ports 22 which are controlled by check-valve portion 15 of member 14—15.

The part 17 is generally cup-shaped. Adjacent flange 18 it has a shoulder which centers the end of spring 5. Thus spring 5 reacts between flange 18 and cup retainer 4. It holds gasket portion 14 seated, retains the piston packing cup 3 on the piston and urges master piston 2 to brake releasing position. The guide portion for valve 19 is cylindrical and of a smaller diameter and is ported at 23 to assure free motion of valve 19. There are, also ports 24 to afford free flow to and from the ports 22.

Operation

When piston 2 is forced to the left to apply the brakes, liquid displaced from cylinder 1 passes through ports 24 and 22, deflects portion 15 and flows freely to connection 12 and thence to the brake cylinders.

When spring 5 is permitted to return piston 2, portion 15 seals on part 16 and closes ports 22. When the differential between pressure in connection 12 and pressure in cylinder 1 is sufficient to unseat valve 19, back-flow occurs, but valve 19 will finally close to retain a moderate pressure on connection 12. This pressure is insufficient to hold the brakes applied against the reaction of the brake releasing springs always used in hydraulic brake clinders, and can be precisely determined by choice of spring 21.

The portion 15 has a marginal seal on valve 19 as shown and this prevents back flow until valve 19 is moved a definite distance from its seat. Consequently, when valve 19 is seated, the member 15 affords a secondary seal which assures retention of the desired minimum pressure in connection 12.

Spring 5 holds the valve assembly seated, but takes no part in any valve function of the assembly. Consequently, spring 5 can be chosen solely on the basis of its function in returning piston 2.

The valve is simple and inexpensive to manufacture, and is precise in its functions. It may be removed and replaced with facility. While the preferred embodiment has been described in considerable detail, modifications within the scope of the claims may be made to adapt it to particular conditions.

What is claimed is:

1. In a multiple valve the combination of a seat member centrally ported for flow in one direction and ported in the area surrounding said central port for flow in the opposite direction; two nonstop valves, one seating against one side of said seat member and having a central portion which protrudes through said central port, said valve controlling said central port, and the other seating against the other side of said port member over the annular area surrounding said central port, said other valve comprising a flexible annulus sealed to said seat member at its outer margin and of greater radial extent than said seat member, so that when both valves are closed against the seat member, at least the inner marginal rim of the second named valve engages and forms a seal with said protruding portion of the first mentioned valve.

2. The combination of means forming a passage through which liquid flows in forward and return directions under reversals of pressure differential, said passage having a shoulder; an annular member of rubber-like material having a marginal portion which seats on said shoulder and serves as a gasket, and an inward flexible flange adapted to function as a check valve; a housing seated on said member and having a seat portion engaging said annular member and formed with at least one flow port controlled by the check valve portion thereof and a central reflux port larger than the central aperture in said annular member, said housing including a valve guide and a spring seat; a poppet type reflux valve guided by said guide and adapted to close said central port, said valve having a convex end which, when the valve is closed, protrudes through said central aperture and engages at least the inner margin of said flexible flange when the latter closes against the seat portion of the housing; a spring sustained by the spring seat and serving to urge the poppet valve in a closing direction; and means serving to hold said housing in sealing engagement with the marginal portion of said annular member.

MARTIN VALENTINE GROVES.

REFERENCES CITED

The following references are of record in the file of this patent:

UNITED STATES PATENTS

| Number | Name | Date |
| --- | --- | --- |
| 1,719,572 | Stoll | July 2, 1929 |
| 1,990,516 | Beckel | Feb. 12, 1935 |
| 2,373,046 | Osborn | Apr. 3, 1945 |
| 2,406,502 | Lines | Aug. 27, 1946 |